Oct. 6, 1964   W. G. HARRISON ETAL   3,151,731
ARTICLE AND CODE TRANSFER APPARATUS
Filed Aug. 14, 1961   3 Sheets-Sheet 1
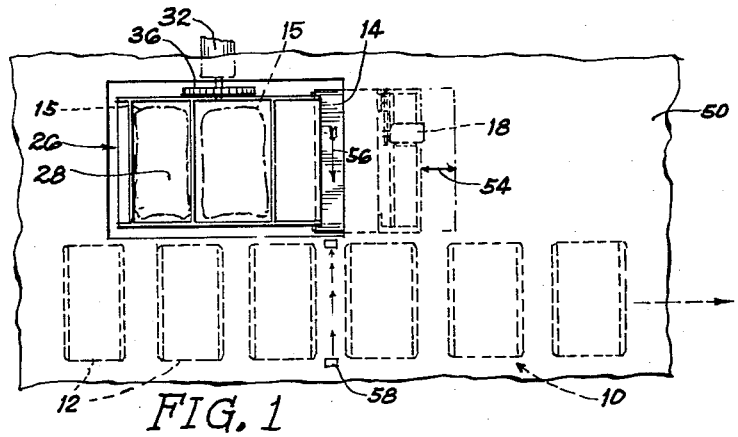
FIG. 1
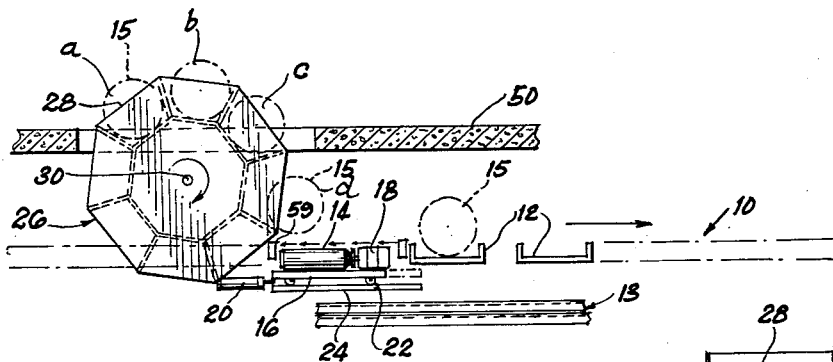
FIG. 2
FIG. 3
FIG. 4
Walter G. Harrison
Leo A. Gary
Allan C. Audet
INVENTORS
BY Ooms, McDougall
and Hersh
Att'ys Oct. 6, 1964    W. G. HARRISON ETAL    3,151,731
ARTICLE AND CODE TRANSFER APPARATUS
Filed Aug. 14, 1961    3 Sheets-Sheet 2

Walter G. Harrison
Leo A. Gary
Allan C. Audet
INVENTORS

BY Donna McDougall
and Hersh
Att'ys

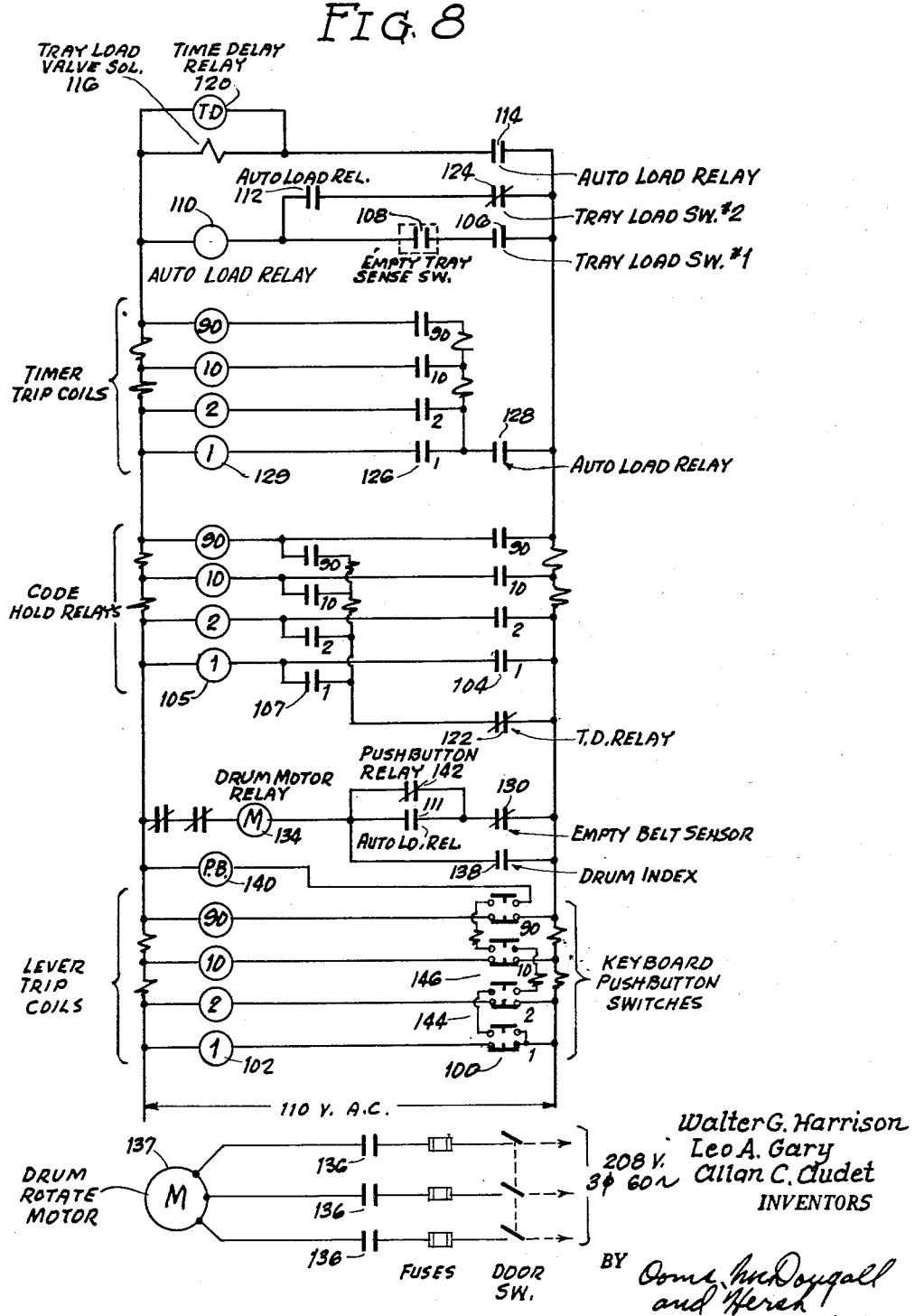

United States Patent Office 3,151,731
Patented Oct. 6, 1964

3,151,731
ARTICLE AND CODE TRANSFER APPARATUS
Walter G. Harrison, Westchester, Leo A. Gary, Chicago, and Allan C. Audet, Arlington Heights, Ill., assignors, by mesne assignments, to Prospect Manufacturing Co. Inc., Chicago, Ill., a corporation of Illinois
Filed Aug. 14, 1961, Ser. No. 131,358
10 Claims. (Cl. 198—38)

This invention relates to an apparatus for transferring articles such as mail bags, sacks or similar packages onto a moving conveyor. The invention relates more particularly to an improved means whereby various articles may be transferred onto a conveyor after which they may be discharged from the conveyor at any of a plurality of preselected stations.

In copending application Serial No. 81,754, filed January 10, 1961, entitled Automatic Sortation System, there is described an apparatus which provides an economical, versatile conveying arrangement for use in the sorting of packages wherein the packages are selectively delivered to respective stations or locations which correspond to various postal zones. The prior disclosed apparatus provides for discharge of articles from the conveyor at stations on either side of the conveyor, thus considerably reducing the distance through which the packages may be conveyed and providing a space and power saving arrangement.

The apparatus disclosed in the prior case is of a type which is flexibly supported from a point moving relative to the respective locations or stations in the conveyor route. The apparatus can be operated in either direction to deposit a package in a desired location while it is being moved. Furthermore, there is provided electrical apparatus common to a number of different locations or stations along the route of the conveyor whereby operation of the electrical apparatus in various combinations selects one station among the many and controls the conveying apparataus to secure the required deposition of an article at a predetermined station.

In a second copending application, entitled Delivery Apparatus, Serial No. 139,140, filed September 19, 1961, there is described a system which is particularly suitable for delivery of certain articles to a conveyor, particularly smaller parcels and similar packages such as are commonly handled in a post office.

It is also desired to provide effective and efficient means for transferring mail sacks and similar relatively large articles to a conveyor of the type described in application Serial No. 81,754. Thus, the mail sacks likewise may be designated for specific locations or postal zones and, therefore, it is desirable to provide a means for selectively delivering the respective sacks to any one of several locations along a conveyor route.

It is preferred that the apparatus move rapidly in response to certain conditions so that a fast moving conveyor may be employed. It is also desirable to have the apparatus capable of essentially automatic operation to enable reduction of time and labor and to reduce the possibility of error. It is particularly important in the case of handling mail sacks and other large articles that the apparatus be ready to handle peak loads and thus prevent a backlog in post office operations as is common today.

It is, therefore, an object of this invention to provide an improved means for transferring mail sacks and similar articles onto a conveyor whereby they may be dischanged from the conveyor at a plurality of preselected stations.

It is an additional object of this invention to provide an apparatus of the type described which is particularly suitable for the handling of large articles, and which is capable of rapid and efficient delivery of the articles.

It is a further object of this invention to provide a means for holding articles of large size, a means for coding the articles so held, a means for transferring the codes with the articles as they are placed on a transfer means, and a means for transferring the codes with the articles to a conveyor means whereby the articles may be discharged from the conveyor at preselected stations corresponding to the codes originally given to the articles.

These and other objects of this invention will appear hereinafter and, for purposes of illustration, but not of limitation, specific embodiments of this invention are shown in the accompanying drawings in which—

FIGURE 1 is a plan view illustrating the article holding, transfer and conveyor mechanisms characterizing the apparatus of this invention;

FIGURE 2 is a front elevation view of the mechanisms shown in FIGURE 1;

FIGURE 3 is a side elevation of the mechanisms shown in FIGURE 1;

FIGURE 4 is a front elevation of an alternative form of the holding, transferring and conveying mechanisms of this invention;

FIGURE 8 is an illustration of a circuit diagram suitable for use in the operation of the disclosed mechanisms.

Figure 5:
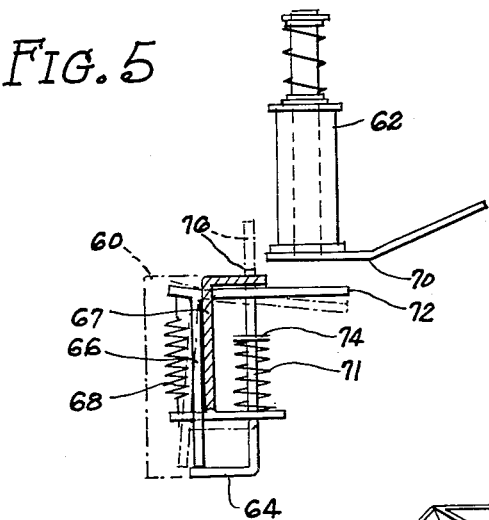
FIGURE 5 is a detail view of a switch actuating mechanism employed for transferring the codes during the operation of the apparatus.

The present invention may be characterized as an apparatus adapted for transferring articles from a compartmented carrier to an intermediate transfer means, the latter being positioned near a conveyor. The conveyor is preferably of the type disclosed in application Serial No. 81,754. The transfer means in a preferred embodiment of this invention is adapted to be driven in two directions, one approximately parallel to the path of movement of the conveyor, and the other approximately perpendicular to the path of movement of the conveyor, whereby the transfer means will pass the articles, which may be mail sacks, onto the conveyor.

fer means and as they are pased to the conveyor. Therefore The inventive apparatus is characterized by means for coding each of the articles placed in the compartmented holding means. Means are also provided for transferring the codes with the articles as they are passed to the transfer means and as they are passed to the conveyor. Therefore, particularly when a conveyor comprised of a plurality of tilt trays with associated memory timers of the type described in application Serial No. 81,754 is employed, the articles will be transferred to locations along the conveyor in accordance with the codes originally given thereto.

The invention will be more readily understood when considering the accompanying drawings wherein there is illustrated a conveyor 10 comprised of a plurality of trays 12 running along a track 13. Although the conveyor shown is of the type described in the aforementioned application, it will be understood that the principles of this invention are suitable for application to other conveyor systems.

The transfer means which is adapted to pass mail sacks 15 or the like to the conveyor comprises, in the embodiment shown, an endless belt 14 mounted on a carriage 16. A motor 18 is associated therewith and is adapted to drive the belt whereby the upper flight thereof goes in a direction perpendicular to the conveyor. A pneumatic cylinder or similar ramming means 20 is connected to the carriage 16 and is adapted to reciprocate the carriage in a direction parallel to the direction of conveyor movement. The carriage 16 is mounted on wheels 22 which run on tracks 24 in order to permit this reciprocal movement. Although the transfer belt illustrated is adapted for movement in the two directions described, it will be apparent when considering the following that movement in a direction perpendicular to the conveyor would be in many cases sufficient for operation in accordance with this invention.

A drum 26 having a plurality of compartments 28 and mounted for rotation on an axis 30 is provided for delivery of the sacks 15 to the belt 14. A motor 32 has a drive shaft connected to a pinion 34 which meshes with a gear 36 mounted on the drum for rotation thereof.

FIGURE 4 illustrates an alternative embodiment wherein a drum 40 having fewer compartments 42 is provided for delivery of sacks 43 down a chute 44 and onto a transfer belt 46. The belt 46 is adapted for passing the sacks to conveyor trays 48.

In the operation of the disclosed apparatus, the sacks are adapted for transfer from an upper floor 50 in a post office or similar establishment. The sacks are loaded in a compartment of the drum after which the drum is caused to rotate in the direction of the arrow. The sacks are then deposited on the transfer belt and the belt in turn will pass the sacks onto the trays of the conveyor 10. In accordance with the preferred embodiment of this invention, the motor 18 and ram 20 are adapted to operate simultaneously whereby an angular direction of movement is imparted to the sack. This permits more accurate positioning of the sack on the trays and enables the use of a faster moving conveyor. The lateral movement of the belt 14 is illustrated by the arrow 56 and the movement effected by the ram 20 is illustrated by the arrow 54. These movements are carried out at high speed after an article has been deposited on the belts 14 or 46.

As noted, it is desirable that means be provided for delivering the deposited articles to any one of a plurality of preselected stations. This means comprises a means for coding the articles as they are loaded into the drum, means for transferring the codes with the articles as they are transferred to the transfer belt, and a means for transferring the codes with the articles as they pass to the conveyor. If the conveyor is of the type disclosed in application Serial No. 81,754, an efficient means is provided for delivering the articles to their preselected positions. The articles are to be transferred simultaneously with the code and it is, therefore, desirable to provide sensing means which will indicate an empty belt and an empty tray whereby the operative steps may proceed. These means are shown as photocells 58 and 59 respectively.

Figure 6:
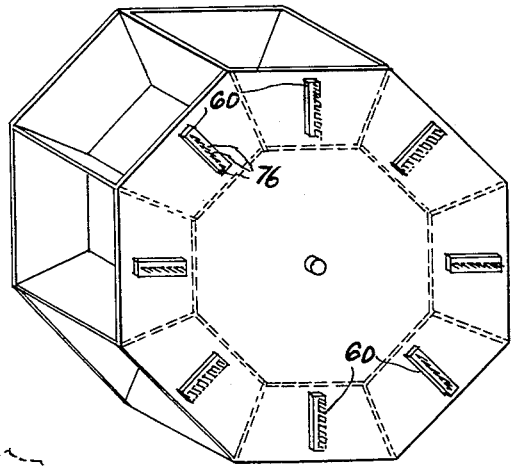
FIGURE 6 is a perspective view of the compartmented drum with associated switch actuating means.
Figure 7:
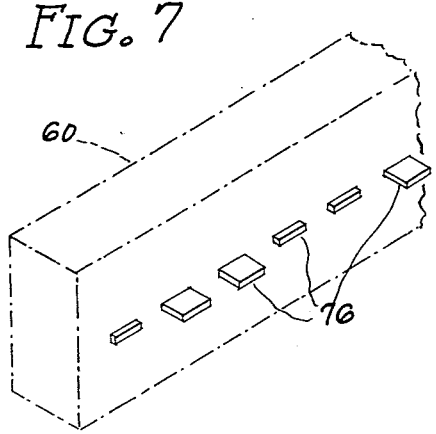
FIGURE 7 is a perspective view of the switch actuating means.

FIGURES 5 through 7 illustrate a mechanism which includes a frame 60 adapted to be attached to the wall of the drum 26. This mechanism is designed for cooperation with a group of solenoids 62 and is adapted to transfer the code of an article placed in the drum as the article is discharged onto the belt 14.

The mechanisms include, in addition to the frame 60, a trip lever 64 and a latch and trip arm 66. A spring 68 is secured to the frame 60 and normally urges the arm 66 toward the main body portion 67 of the frame.

Lever set-up arm 70 is connected to the movable core of the solenoid 62. A spring 71 having one end fixed at 74 normally urges the trip lever 64 upwardly. Thus, downward movement of the arm 70 into engagement with extension 72 of arm 66 will cause the arm 66 to pivot against the urging of spring 68. Therefore, the lever 64 will spring upwardly and switch actuating surface 76 thereof will be exposed as indicated by the dotted lines. The exposed surface 76 serves to actuate a switch in the code transfer circuit as will be hereinafter explained.

A frame 60 is provided for association with each of the compartments 28 and a plurality of solenoids 62 are provided near the upper extremities of the drum whereby selected ones of the surfaces 76 may be exposed for each compartment in accordance with a desired code. Thus, eighteen levers 64 may be associated with each compartment, and eighteen solenoids 62 provided adjacent the loading area for a given compartment. The solenoids and levers may correspond to units digits 1 to 9 and 10's digits 10 to 90 thereby giving 99 possible coding variations. When it is desired to code a particular compartment having a sack therein designated for a particular postal zone, the solenoids 62 are actuated and corresponding surfaces 76 will then be exposed for actuation of switches when that particular compartment deposits the sack therein on the transfer belt.

The circuitry employed to effect the above-noted results is shown in FIGURE 8. The operation of the apparatus employing this circuitry will now be described in conjunction with the handling of mail sacks or the like having addresses or other identification indicating that they should be deposited at a particular location adjacent the conveyor 10.

A sack is placed in the drum 26 and the operator pushes a particular button or buttons on a keyobard corresponding to the code to be imparted to the sack. Assuming that the button 1 in FIGURE 8 is the desired code, switch 100 will be closed and relay 102 energized. Energization of the relay 102 will actuate the solenoid 62 and the set-up arm thereof will engage extension 72 of trip lever 64 exposing a surface 76 corresponding to the code 1.

The rotation of the drum occurs in accordance with the following sequence. When a tray 12 of the conveyor 10 is in position for receipt of an article, the conveyor will mechanically close a switch 106. If sensing means 58 senses that the tray is empty, switch 108 will also be closed and relay 110 will be energized. Relay 110 will cause the closing of switch 111 and if sensing means 59 senses an empty transfer belt, switch 130 will be closed and the drum motor relay 134 will be energized. This relay 134 will close switches 136 of the drum, rotate motor 137 and the drum will commence to rotate.

The drum motor relay 134 also completes its own holding circuit by closing drum index switch 138. This switch 138 will remain closed through one increment of rotation of the drum. This increment will be sufficient to cause a succeeding compartment of the drum to dump a sack onto the transfer belt. The switch 138 is mechanically opened each time the drum indexes one position.

As the drum rotates to dumping position for a given compartment, the exposed surfaces 76 associated therewith will mechanically trip switch 104 thereby energizing relay 105. This relay is adapted to close switch 107 thus completing its own holding circuit through normally closed time delay relay switch 122.

Relay 105 also closes switch 126 and switch 128 has been closed by means of the energization of relay 110. Therefore, relay 129 is energized which results in the actuation of a memory timer associated with the conveyor. The timer is of the type disclosed in Serial No. 81,754, and energization of relay 129 or any of the similar relays corresponding to the various code combinations has the same effect as operating a push button in the keyboard disclosed in the prior apparatus. The difference in the instant operation is, of course, that the article is coded while loading the sack into a compartment in the drum, and the inventive arrangements enable transfer of the code with the mail sack when that particular compartment dumps the sack onto the belt. Furthermore, the code is automatically transferred to the memory timer by the disclosed apparatus.

Energization of the solenoid 116, which is occasioned due to the fact that relay 110 closes switch 114, is responsible for actuating the motor 18 and ram 20 associated with the belt 14. Thus, the sack is transferred from the belt to the tray along with the code transfer operation. The motor 18 is preferably of the hydraulic drive type, permitting quick, high speed response to the closing of switch 114, thereby enabling passing of heavy sacks onto the trays. Reference is made to the aforementioned copending application entitled Delivery Apparatus for similar hydraulic drives having high speed article throwing capabilities.

Switch 112 is closed upon energization of the relay 110 and, therefore, a holding circuit is completed which will cause the relay 110 to remain energized substantially throughout a loading cycle. Mechanically operated, normally closed switch 124 will remain closed until the tray has completed about 90% of its travel past the belt. Means associated with the tray or conveyor are then provided for opening the switch 124 and thus the coil 110 will be de-energized and made ready for the next cycle.

In order to guarantee sufficient time for transfer of the code to the memory timer device, a time delay relay 120 is provided. This relay is energized when the relay 110 closes switch 114. The relay 120 is operative to open switch 122 approximately one-half second after the relay 110 is de-energized. In other words, opening of switch 124 and de-energization of relay 110 will cause switch 114 to open. However, relay 120 will not open switch 122 until approximately one-half second thereafter. The operation of relay 120 is dependent upon conventional time delay relay principles.

A push button relay 140 is provided for preventing rotation of the drum while the operator is using the keyboard. The relay 140 holds normally closed switch 142 open when a push button is in use.

Assuming that the sack which was coded by actuating switch 100 is sack $a$ (FIG. 2), it will be apparent that sacks $b$, $c$, and $d$ will be dumped before sack $a$. Since each compartment of the drum is supplied with a frame 60, the exposed switch actuating surfaces 76 will be carried along for each indexing of the drum. It will be apparent that the surfaces 76 can be readily restored to a non-exposed condition after tripping switches 104 and before being again indexed to loading position by providing means for pushing the surfaces 76 downwardly whereby the arm 66 will again engage the lever 64.

In summarizing, it will be obvious that the disclosed apparatus provides a drum having a plurality of compartments each having sacks therein and each having a frame 60 with exposed switch actuating surfaces 76 coding the sacks. The apparatus provides a means for sensing an empty transfer belt and, with such a condition the drum will index to dump the sack on the belt. The surfaces 76 will at this time trip switches 104 to transfer the code for the dumped sack. With a conveyor tray empty and in position the solenoid 16 will operate to cause passing of the sack onto the conveyor and the relay 129 will actuate the conveyor memory timer to provide for transfer of the code with the sack.

Although the apparatus has been described with reference to a single code number, namely, number 1, it is apparent that any other number up to 99 is possible with respect to the operation of the apparatus. Thus, if the number 12 were the desired code, push buttons 144 and 146 would both be actuated and solenoids 62 corresponding to the 10 and 2 trip levers for that compartment would cause the 10 and 2 switch actuating surfaces 76 to be exposed. The above described cycle of operation will then take place in an obvious fashion.

It is further considered to be within the scope of this invention to provide means other than the frames 60 for transferring the codes of the articles as they pass from the drum to the tray. Thus, the code for an article could be registered in a memory core as the article is placed in the dum and the core synchronized with the drum whereby the core will operate to close a switch or switches corresponding to switch 104 thus enabling further transfer of the code with the article as it passes to the conveyor.

The disclosed system is not limited to the use of a belt for passing articles to the conveyor trays and other transfer means are contemplated which can transfer the articles to the trays while still permitting simultaneous transfer of the associated code. It is considered, for example, that the tiltable table of applicants' aforementioned copending application "Article Delivery Means" could be employed in lieu of the belt. Although reference has been made to the handling of mail sacks and other large articles, it will be understood that these references were employed only as illustrative examples and are not to be considered limiting insofar as the areas of use or the nature of articles that can be handled are concerned.

It will be understood that various modifications may be made in the above described apparatus which will provide the characteristics of this invention without departing from the spirit thereof, particularly as defined in the following claims.

We claim:
1. An apparatus for transferring articles onto a conveyor comprising a compartmented means capable of holding and dumping said articles, a transfer means positioned adjacent said compartmented means adapted to pass said articles to said conveyor, means for assigning a code to each compartmented means as an article is loaded therein, means for transferring the codes from said compartmented means as the articles are dumped onto the transfer means and means for retaining the transferred codes whereby said articles can be delivered to preselected stations by said conveyor when the articles are passed to the conveyor.

2. An apparatus according to claim 1 wherein said conveyor is comprised of a series of tiltable trays, and including means for sensing an empty tray, said sensing means being adapted to initiate operation of said transfer means whereby said transfer means is effective to pass articles onto said trays.

3. An apparatus for transferring articles onto a conveyor comprising a rotatable drum having a plurality of compartments formed in the periphery thereof capable of holding said articles, said compartments having an open top whereby said articles may be placed therein and dumped therefrom in the course of movement of said drum, an endless transfer belt mounted on a carriage and positioned adjacent the path of movement of said drum and below the axis of rotation of said drum whereby articles contained therein will be dumped onto said belt, means for driving said belt in a direction parallel to the axis of rotation of said drum, means for reciprocating said carriage in a direction perpendicular to the driving direction thereof, said conveyor moving in a path adjacent the end of said transfer belt and approximately parallel to the path of reciprocation thereof and said belt being adapted to pass the articles dumped thereon onto said conveyor, the driving means for said transfer belt and the reciprocating means for said carriage combining to give an angular path to said articles as they pass from the belt to the conveyor.

4. An apparatus according to claim 3 wherein said conveyor is comprised of a series of tiltable trays, and including means for sensing an empty tray, said sensing means being adapted to initiate operation of said transfer means whereby said transfer means is effective to pass articles onto said trays.

5. An apparatus according to claim 3 wherein said conveyor is adapted to deliver said articles to a plurality of preselected stations, and including means for coding said compartments as the articles are loaded onto said drum, means for transferring said code from said compartmented means as said articles are dumped onto said belt and means for transferring said codes to said conveyor as said articles are passed thereto whereby said articles will be delivered to said preselected stations.

6. An apparatus for transferring articles onto a conveyor comprising a compartmented means capable of holding and dumping said articles, a transfer means positioned adjacent said compartmented means adapted to pass said articles to said conveyor, means for coding said compartmented means as said articles are deposited in said compartmented means, switch actuating means associated with each of the compartments in said compartmented means adapted to throw a switch for transferring said codes from said compartment means as said articles are dumped on said transfer means, and means for temporarily retaining said transferred code whereby said articles can be delivered to preselected stations by said conveyor after the articles are passed to the conveyor.

7. An apparatus according to claim 6 including means for determining the presence of articles on said transfer means whereby said compartmented means will be prevented from dumping articles until said transfer means is empty.

8. An apparatus according to claim 6 wherein said conveyor includes a plurality of trays for receiving and discharging said articles and wherein said apparatus includes means for sensing empty trays on said conveyor, a first transfer means drive switch connected to said sensing means, a second transfer means drive switch operated by said conveyor and adapted to close when said trays are in position for receiving said articles whereby the drive means for said transfer means is adapted to operate when an empty tray is in said receiving position.

9. An apparatus for transferring articles onto a conveyor comprising a compartmented means capable of holding and dumping said articles, a transfer means positioned adjacent said compartmented means adapted to pass said articles to said conveyor, means for coding said compartmented means as articles are loaded therein, means for transferring the codes from said compartmented means as the articles are dumped onto the transfer means, means for temporarily retaining the transferred codes whereby said articles can be delivered to preselected stations by said conveyor, said transfer means being driven in two directions, one approximately parallel to the path of movement of said conveyor, and the other approximately perpendicular to said path, whereby said articles are passed at an angle onto said conveyor.

10. An apparatus for transferring articles onto a conveyor comprising a rotatable drum having a plurality of compartments formed in the periphery thereof capable of holding said articles, said compartments having an open top whereby said articles may be placed therein and dumped therefrom in the course of movement of said drum, and endless transfer belt mounted on a carriage and positioned in the path of movement of said drum and below the axis of rotation of said drum whereby articles contained in the drum can be dumped onto said belt, means for driving said belt in a direction parallel to the axis of rotation of said drum, said conveyor moving in a path approximately perpendicular to the direction of movement of said belt whereby articles dumped onto said belt by means of said drum can be passed onto said conveyor.

References Cited in the file of this patent

UNITED STATES PATENTS

| | | |
|---|---|---|
| 2,160,557 | Odell | May 30, 1939 |
| 2,743,808 | Veenemans | May 1, 1956 |
| 2,834,484 | De Vaney et al. | May 13, 1958 |
| 3,034,665 | Speaker | May 15, 1962 |
| 3,086,636 | Raynor | Apr. 23, 1963 |
| 3,100,040 | Kleist | Aug. 6, 1963 |

FOREIGN PATENTS

| | | |
|---|---|---|
| 632,403 | Great Britain | Nov. 28, 1949 |
| 863,239 | Great Britain | Mar. 22, 1961 |